United States Patent [19]

Schubert

[11] Patent Number: 5,077,261

[45] Date of Patent: Dec. 31, 1991

[54] SULFUR ABSORBANTS

[75] Inventor: Paul F. Schubert, Bartlesville, Okla.

[73] Assignee: Phillips Petroleum Company, Bartlesville, Okla.

[21] Appl. No.: 542,996

[22] Filed: Jun. 25, 1990

[51] Int. Cl.$^5$ ............................................. B01J 20/10
[52] U.S. Cl. ................................... 502/408; 502/407; 423/230; 423/244
[58] Field of Search ............... 502/407, 408, 517, 400, 502/343, 250, 224; 423/230, 244

[56] References Cited

U.S. PATENT DOCUMENTS

| | | | |
|---|---|---|---|
| 3,494,875 | 2/1970 | Le Page et al. | 252/454 |
| 3,678,120 | 7/1972 | Bloch | 502/224 |
| 4,135,941 | 1/1979 | Skalay et al. | 106/100 |
| 4,402,924 | 9/1983 | McVicker et al. | 502/224 |
| 4,939,115 | 7/1990 | Parker et al. | 502/408 |
| 4,983,365 | 1/1991 | Denny et al. | 502/517 |
| 4,983,566 | 1/1991 | Wieserman et al. | 502/401 |

*Primary Examiner*—Anthony McFarlane
*Attorney, Agent, or Firm*—Charles W. Stewart

[57] ABSTRACT

A method of preparing a novel absorption composition comprising zinc oxide, silica and a fluorine-containing acid by mixing a fluorine-containing acid with zinc oxide and silica followed by an agglomeration step. The novel composition, which can be prepared by the novel method, is utilized by contacting a fluid stream with the novel composition to remove sulfur from the fluid stream. A further embodiment of the method of preparation involves utilizing a technique for spraying a fluorine-containing acid upon a zinc oxide and silica mixture while mixing the mixture by an inclined rotating disk agglomerator.

28 Claims, 1 Drawing Sheet

SULFUR ABSORBANTS

BACKGROUND OF THE INVENTION

This invention relates to sulfur-absorbant compositions, the manufacture of sulfur absorbants and their use.

The removal of sulfur from fluid streams can be desirable or necessary for a variety of reasons. If the fluid stream is to be released as a waste stream, removal of sulfur from the fluid stream can be necessary to meet the maximum sulfur emission requirements set by various air pollution control authorities. Such requirements are generally in the range of about 10 ppm to 500 ppm of sulfur in the fluid stream. If the fluid stream is to be burned as a fuel, removal of sulfur from the fluid stream can be necessary to prevent environmental pollution. If the fluid stream is to be processed, removal of the sulfur is often necessary to prevent the poisoning of sulfur-sensitive catalysts or to satisfy other process requirements.

Various absorption compositions have been used to remove sulfur from fluid streams when the sulfur is present as hydrogen sulfide ($H_2S$). It has been proposed that the compound zinc oxide (ZnO) be used as a material for absorbing hydrogen sulfide, however, the material by itself lacks the properties necessary for being an effective commercially usable absorbing material. In order for an absorbent composition to be commercially usable, it must have a high sulfur-absorption capacity and sufficient mechanical strength to permit its use as a contact material that is placed as a bed within a contact vessel. Furthermore, it is important for the commercial viability of the absorbing material for it to have the ability to be regenerated, after becoming spent, numerous times without appreciable loss of the absorption power with respect to the sulfur compounds and without reduction of the mechanical strength. While zinc oxide in combination with certain porous media is an effective absorbent, the material does not possess many of the properties required for an effective, commercially viable absorption material.

One approach used to resolve the problems of inadequate mechanical strength and unregenerability is to add binders to the zinc oxide and porous media material. While various binders have been proposed, many have certain negative consequences from their use. One negative aspect from the use of a binder material is that it replaces a certain volume and mass of the active absorption material with an essentially inert material. Consequently, for a given absorption capacity, a larger volume of material will be required thus necessitating larger contact vessels for holding the material. Additionally, in many instances, the binder material can be more costly than the absorption material resulting in a more costly product based upon the capacity of the composition to absorb sulfur. Moreover, the use of certain binder materials, such as alumina ($Al_2O_3$), cause sulfur dioxide ($SO_2$) slippage by causing certain amounts of hydrogen sulfide in a fluid stream to be converted into sulfur dioxide and to pass along with a treated effluent stream.

An additional problem that has been encountered in the manufacture of absorption compositions is equipment wear caused by the abrasive nature of the absorption materials being manufactured. In certain attempts to produce commercial quantities of absorbent compositions, excessive equipment wear and downtime caused by the abrasive characteristics of the absorption material components have, in effect, rendered the production commercially unviable.

SUMMARY OF THE INVENTION

It is thus an object of the present invention to provide an improved absorption composition capable of removing certain sulfur compounds from fluid streams.

It is yet another object of the present invention to provide an improved process for the production of a strength-enhanced absorption composition.

A still further object of this invention is to provide an absorption process for the removal of sulfur from fluid streams.

Yet another object of the present invention is to provide an absorption composition characterized by exceptional mechanical strength and high regenerability.

In accordance with this invention, a strength-enhanced absorption composition comprising a mixture of zinc oxide and silica is prepared by treating the mixture with a fluorine containing acid. The acid serves as a binder which partially dissolves the zinc oxide and silica so as to cause them to bind together thus creating a strength enhanced composition. This composition can be used in a process for removing sulfur from a fluid stream by contacting a fluid stream containing certain sulfur compounds under suitable absorbing conditions with the strength enhanced composition.

In another aspect of this invention there is provided a process for the preparation of an absorption composition comprising mixing zinc oxide, silica and a fluorine-containing acid to produce a mixture and agglomerating said resulting mixture.

In accordance with yet another aspect of this invention there is provided a process for removing sulfur from a fluid stream comprising contacting the fluid streams under appropriate conditions with an absorption compound comprising a mixture of zinc oxide, silica and a fluorine containing acid.

BRIEF DESCRIPTION OF THE DRAWINGS

Other aspects, objects and advantages of this invention will become apparent from a study of this disclosure, appended claims, and the drawing in which:

DETAILED DESCRIPTION OF THE INVENTION

Figure 1:
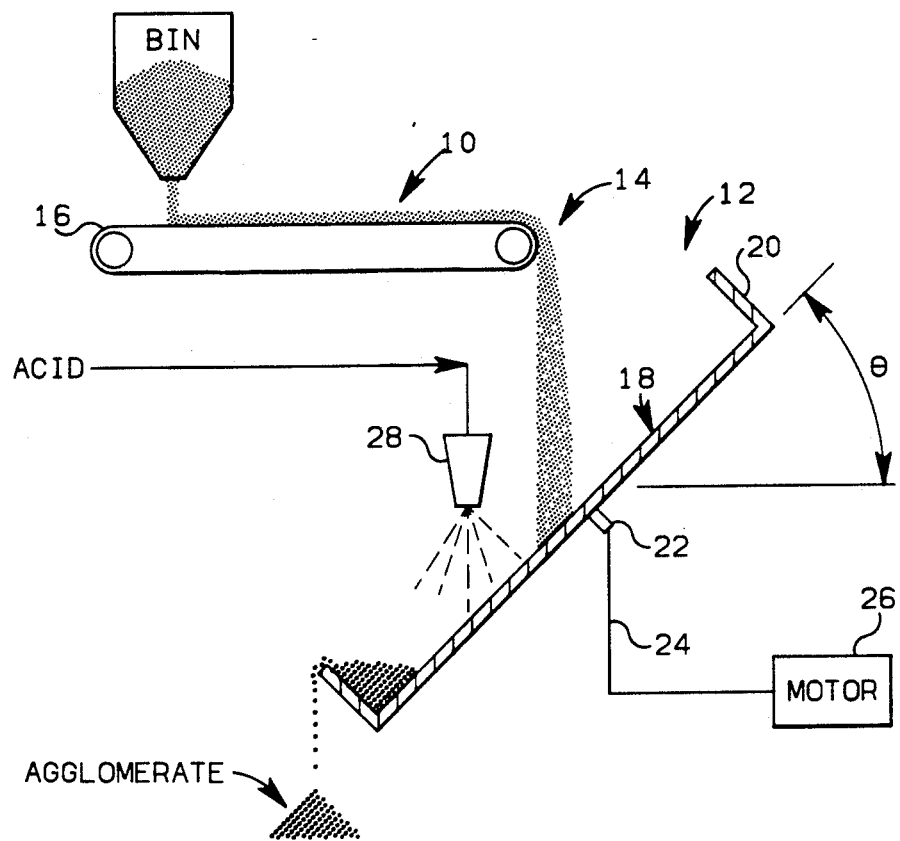
FIG. 1 is a schematic representation of the inventive process illustrating certain features of the present invention.

In accordance with the present invention, a strength-enhanced absorbing composition comprising a mixture of zinc oxide and silica is prepared by treating the mixture with a fluorine containing acid. The treated strength enhanced absorbing composition can be utilized to remove sulfur compounds from fluid streams that contain such compounds. These sulfur compounds are removed by contacting the fluid stream, which is contaminated with a sulfur compound, with the absorbing composition under suitable absorbing conditions to substantially reduce the concentration of such sulfur compounds therein. A further aspect of the present invention is the use of a fluorine containing acid in the preparation of sulfur absorbing compositions that contain highly abrasive components, such as silica, in a manner which eliminates certain previously used production steps and minimizes production equipment wear.

In a preferred process for preparing the absorption composition, a fluorine-containing acid is mixed with zinc oxide and silica to form a mixture. This mixture is then agglomerated to form any suitable shape for use in the contacting of sulfur containing fluids. By treating the composition with a fluorine-containing acid, there is eliminated the need for certain absorption-inactive binders, strengtheners, or support materials. It is believed that the strength imparted to the zinc oxide and silica absorption composition is a result of the unique ability of the fluorine containing acid to solubilize the silica and zinc oxide in a manner which causes the formation of solid bridges between the component particles thereby binding the particles together.

For the purposes of this application, the term fluorine-containing acid means acids comprised of inorganic elements and containing fluorine as a constituent. Suitable fluorine-containing acids can be, for example, fluotitanic acid, or hexafluorotitanic acid, or dihydrogen hexafluorotitanate ($H_2TiF_6$); fluoboric acid, or tetrafluoroboric acid ($HBF_4$); fluophosphoric acid, such as fluorophosphoric acid or phosphorofluoridic acid ($H_2PO_3F$); difluorophosphoric acid or phosphorodifluoridic acid ($HPO_2F_2$); hexafluorophosphoric acid or hydrogen hexafluorophosphate ($HPF_6$); fluosilicic acid or hexafluorosilicic acid or dihydrogen hexafluorosilicate ($H_2SiF_6$); and hydrofluoric acid (HF). Hydrofluoric and fluosilicic acids are the preferred fluorine containing acids.

Any suitable amount of fluorine-containing acid can be used to treat the silica and zinc oxide mixture which will provide the desired agglomeration and strength of the mixture. The fluorine-containing acid can, however, generally be employed in an amount of up to about 25 parts by weight per 100 parts by weight of the total combined weight of zinc oxide and silica. It is preferred that the fluorine containing acid be used in an amount in the range of from about 0.1 to about 20 parts by weight per 100 parts by weight of the total combined weight of zinc oxide and silica with the range of from about 0.1 to about 5 parts by weight being the most preferred range.

As for the acid concentration employed in the process for preparing the absorption composition, any suitable concentration can be used which will provide the desired agglomeration and strength of the composition. The fluorine containing acids employed can be pure reagent grade acids or industrial grade acids, such as those which are the by-product of other chemical reactions. Generally, the acid is in the form of an aqueous solution having a concentration in the range of from about 0.1 weight percent to about 48 weight percent. The term weight percent when referred herein to the concentration of an aqueous acid solution means the weight of the concentrated acid as a fraction of the total weight of the dilute acid multiplied by a factor of one-hundred. The preferred acid concentration that can be used in the process for preparing the absorption composition is in the range of from about 0.1 weight percent to about 15 weight percent. Most preferably, the acid concentration range is from about 0.1 weight percent to about 6 weight percent.

The absorption composition comprises any suitable mixture of silica and zinc oxide which will achieve the desired absorption of sulfur compounds; however, the best ratio of the components depends upon the optimization of the various physical properties desired and the economics of a given use. Generally, because of the large porous volume and great surface area of silica, the use of silica in the composition imparts the desirable properties of porosity and high surface area to the composition which accommodates the absorption of sulfur compounds. The silica is essentially inert, but when it is combined with zinc oxide, the absorption process is facilitated. As for the incorporation of the zinc oxide component of the composition, it is preferred to maximize the amount of this active component within the various constraints mentioned herein. There is some outer limit at which point the mechanical strength of the composition decreases to an unacceptable level and where there is insufficient porosity and surface area to provide for effective absorption.

Generally, the zinc oxide will be present in the absorption composition in an amount in the range of from about 10 weight percent to about 90 weight percent. Preferably, zinc oxide can be present in the range of from about 25 weight percent to about 80 weight percent. Most preferably, zinc oxide can be present in the absorption composition in the range of from about 45 weight percent to about 70 weight percent. As used herein, the term "weight percent", when referring to components of the absorption composition, is defined as parts by weight per 100 parts by weight of the total combined weight of the absorption composition.

The zinc oxide used in the preparation of the absorbing composition can either in the form of zinc oxide, or in the form of one or more zinc compounds that are convertible to zinc oxide under the conditions of absorption composition preparation described herein. Examples of such zinc compounds include zinc sulfide, zinc sulfate, zinc hydroxide, zinc carbonate, zinc acetate, and zinc nitrate. Preferably, the zinc oxide is in the form of powdered zinc oxide.

Any amount of silica suitable for imparting the desired porosity can be present in the absorption composition and, generally, can be present in the absorbing composition in an amount in the range of from effective quantities up to about 80 weight percent. Preferably, silica can be present in the range of from about 20 weight percent to about 70 weight percent. Most preferably, silica can be present in the absorption composition in the range of from about 30 weight percent to about 55 weight percent.

The silica used in the preparation of the absorbing composition can be either in the form of silica, or in the form of one or more silicon compounds that are convertible to silica under the conditions of absorption composition preparation described herein. Any type of silica suitable for imparting the desired porosity can be used in the absorbing composition employed in the process of the present invention. Examples of suitable types of silica include diatomite, silicate, silica colloid, flame-hydrolyzed silica, hydrolyzed silica, and precipitated silica, with diatomite being presently preferred. Examples of silicon compounds that are convertible to silica under the production conditions used in the preparation of the absorption composition described herein include silicic acid, sodium silicate, and ammonium silicate.

A preferred method for preparing the absorption composition is to combine silica and zinc oxide with a fluorine-containing acid in any suitable mixing device capable of achieving the desired degree of mixing. These components can be mixed in a batchwise fashion or a continuous fashion provided that the components are thoroughly and intimately mixed prior to further processing. Suitable types of batch mixers include, but are not limited to, change-can mixers, stationary-tank mixers, double-arm kneading mixers having any suitable type of agitator blades such as sigma blades, dispersion blades, multiwiping overlap blades, single curve blades, double-naben blades, and the like. Suitable types of continuous mixers can include, but are not limited to, single or double screw extruders, trough-and-screw mixers and pug mills. To achieve the desired dispersion of the absorption material components, the materials are mixed until a homogenous mixture is formed. The mixing time should be sufficient to give a uniform mixture and, generally, will be less than about 45 minutes. Preferably, the mixing time will be in the range of from about 2 minutes to about 15 minutes.

It is also a preferred method to blend the solid particle absorption material components, which can include silica and zinc oxide, prior to the addition of a fluorine-containing acid. The blending or mixing of the absorption material components can be performed by any suitable method of mixing. Suitable types of solids-mixing machines can include, but are not limited to, tumblers, stationary shells or troughs, muller mixers which are either batch type or continuous type, impact mixers, and the like. The blending of the solid particle components can be conducted during any suitable time period necessary to properly homogenize the mixture. Generally, however, the blending time is usually less than about 60 minutes. Preferably, the mixing time will be in the range of from about 2 minutes to about 30 minutes.

Following the blending step, a fluorine-containing acid is added to the blended material and intimately mixed in the same manner as that used to mix the absorption material components and fluorine-containing acid when a prior blending step is not used.

The treating of the absorption material components with a fluorine-containing acid improves the physical strength of the final absorption composition and aids in the agglomeration step. The addition of a fluorine-containing acid in the manner hereinabove described gives a mixture which is in the form of an extrudable paste or paste. After the end of the mixing step, the paste can optionally undergo a curing or aging step prior to agglomeration. The aging or curing of the paste allows time for the fluorine-containing acid to dissolve the silica and zinc oxide. Additionally, the aging of the mixture tends to result in a change in the physical properties of the paste so as to make it easier to extrude and so as to give the end-product a higher crush strength. The paste can be aged for any suitable amount of time sufficient to achieve the desired properties and to allow the appropriate amount of dissolution of the silica and zinc oxide. The paste will generally be aged for a period of time in the range upwardly to about 120 minutes, and will preferably be aged for a period of time in the range upwardly to about 60 minutes.

Following the mixing step, or optionally the curing step, the paste material undergoes an agglomeration step. The agglomeration step is utilized to enlarge the size of the absorption material particles and to form them into relatively permanent masses having certain desirable forms such as spheroids, pills or tablets, cylinders, irregular extrusions or merely loosely bound aggregates or clusters. Any suitable method of agglomeration known in the art can be used. Examples of such methods include, but are not limited to, molding, tableting, pressing, pelletizing, extruding, and tumbling. The preferred method, however, is by extrusions. Various types of extrusion methods and extrusion equipment can be used. It is preferred to use either a single-screw extruder or a double-screw extruder which uses a screw or auger to convey or force the paste through a die plate to produce the desirable shapes or extrusion profiles.

After the paste is extruded, the extruded material is then dried, preferably at a temperature generally in the range of from about 75° C. to about 300° C., and more preferably in the range of from about 90° C. to about 250° C., for a period of time generally in the range of from about 0.5 hour to about 4 hours and, more preferably, in the range of from about 1 hour to about 3 hours. The dried, extruded material is then calcined in the presence of oxygen at a temperature suitable for achieving the desired degree of calcination, for example generally in the range of from about 375° C. to about 750° C. and, more preferably, in the range of from about 500° C. to about 700° C. The calcination step is conducted for a period of time suitable for achieving the desired degree of calcination, for example, generally in the range of from about 0.5 hour to about 4 hours and, more preferably, in the range of from about 1 hour to about 3 hours to produce the absorbing composition.

Another preferred method for the manufacture of certain absorbant compositions such as, for example, those comprising zinc oxide, silica, alumina and nickel oxide, involves the utilization of balling devices or pelletizers with the use of fluorine-containing acids to promote the binding of the solid particles into spherical agglomerates or pellets. This method of preparation solves many of the problems associated with the use of various extrusion methods for agglomerating absorbant compositions. For instance, due to the highly abrasive nature of the silica component of certain absorbant compositions, severe die wear occurs when the absorbants are extruded through extruder dies. Balling devices eliminate the problems associated with die wear by using tumbling action to cause particle collision so as to form spherically shaped pellets by the natural adherence of the particles. In addition, the use of a fluorine-containing acid, which serves as a binder or a wetting agent to promote the mutual adherence of the solid particles, also improves the mechanical strength of the final absorption composition. It is believed that the mechanical strength imparted to the zinc oxide, silica, alumina, and nickel oxide absorption composition is a result of the unique ability of the fluorine-containing acid to solubilize the silica and zinc oxide in a manner which causes the formation of solid bridges between the component particles thereby binding the particles together.

Any suitable balling device can be used in the method of preparation of the absorbant composition. Generally, tumbling type agglomerators comprising standard inclined, rotating disk or drum agglomerators are preferred for use in the method of this invention. FIG. 1 is provided to illustrate the use of a typical inclined pan on disk type agglomerator used in the process of this invention. As shown in FIG. 1, a feeder device 10 is provided so that material can be charged to pan 12 of the agglomerator. Any suitable feeder for charging material can be used. That which is shown in FIG. 1, however, is a belt type conveyor on which the agglomerate charge material 14 comprising the absorbant components is conveyed and discharged to pan 12 by a moving belt 16. Pan 12 comprises a disk 18 that is equipped with a rim 20 attached to the outer perimeter edge of disk 18 so as to form an essentially open-end cylindrically shaped device. To promote the lifting and cascading of the material in pan 12, the inside surface of disk 18 can optionally be provided with a rough surface by any suitable means including, for example, expanded metal, abrasive coatings or metalized surfaces. Disk 18 can be any suitable diameter necessary for giving the required capacity and can range from less than one foot in diameter to more than twenty feet in diameter. The depth of pan 12 is set by the height of rim 20, which can be any suitable height that will promote the desired agglomeration. Generally, the height of rim 20 will approximate twenty percent of the diameter of disk 18.

Provided on disk 18 is a rotation means 22 which permits the rotation of pan 12 about its axis. Rotation means 12 is connected by a linking means 24 for transmitting power from power means 26 to rotation means 22. Power means 26 can be any suitable device for imparting the power necessary for rotating pan 12 about its axis and can include electrical motors of any type, engines of any type or turbines of any type. Preferably, however, power means 26 is an electrical motor with linking means 24 being any suitable device including those devices which can permit variable speed control of pan 12.

Pan 12 can be inclined at an angle from the horizontal plane, as depicted in FIG. 1 and as referred to in FIG. 1 by the Greek letter theta ($\theta$), in the range of from about 15° to about 75°; but, generally, the angle of inclination will range from about 30° to about 65°. The agglomerate or pellet size is significantly influenced by the angle of inclination of pan 12.

To treat and agglomerate the absorption composition, the absorbant component materials or agglomerating charge 14 is fed to pan 12. As disk 18 is rotated about its axis, the material on disk 18 undergoes a tumbling action. A fluorine-containing acid solution is sprayed through nozzle 28 upon the materials while disk 18 is rotating. While FIG. 1 illustrates spray nozzle 28 as the means by which the fluorine containing acid is contacted with the agglomerate material, any suitable method known in the art for spraying or contacting a liquid upon the dry agglomerate powder can be used. The agglomerating charge is moistened by the fluorine-containing acid solution that aids in the formation of pellets. The tumbling action of the materials within rotating pan 12 causes what is sometimes referred to as a "snowballing" effect whereby the moistened material agglomerates as the dampened particles come into contact with other particles thereby forming spheroids. The fluorine-containing acid used in this process not only provides moisture, which causes adhesion of the particles by capillary attraction of the particle surfaces, but also, the fluorine-containing acid solubilizes or dissolves the silica component of the absorption composition. By partially dissolving the silica component, the agglomeration is assisted and the crush strength of the final absorption composition is improved.

The dry absorbant components used in the preparation method which utilizes tumbling type agglomeration can include zinc oxide, silica, alumina and nickel oxide or any variation or combination of one or more of these components. When using this particular embodiment of the invention, the preferred materials are zinc oxide, silica, alumina and nickel oxide. While generally the components are mixed or blended prior to charging the tumbling agglomerator, the components can be mixed by utilizing the tumbling action created by the tumbling agglomerator. Preferably, the components are to be mixed or blended by the methods already described herein prior to charging the tumbling agglomerator.

There are various operating factors of rotating pan 12 which affect the ultimate size of the spheroids formed. Some of these operating factors can include, but are not limited to, the rotational speed of pan 12, the angle of inclination ($\theta$) of pan 12, the location and rate of introduction of both liquid feed and solid feed and the ratio of the height of rim 20 to the diameter of disk 18. These factors, among others, are to be adjusted to provide the desired agglomerate or pellet size.

Any suitable acid solution concentration which provides the desired agglomeration and mechanical strength enhancement can be used in this method of preparation. Generally, the acid is in the form of an aqueous solution having a concentration in the range of from about 0.1 weight percent to about 48 weight percent. The preferred acid concentration is in the range of from about 0.1 weight percent to about 15 weight percent. Most preferably, the acid concentration range is from about 0.1 weight percent to about 6 weight percent.

The resultant absorption composition can be used in an absorption process for removing sulfur compounds from fluid streams. It is believed that in the absorption process the sulfur compound hydrogen sulfide is absorbed by the absorbing composition and thus the terms "absorption process" and "absorbing composition" as used herein are utilized for the sake of convenience. However, the exact chemical phenomenon occurring is not the inventive feature of the process of the present invention and the use of the term "absorb" in any form is not intended to limit the present invention.

The absorption process is preferably carried out in cycles comprising an absorption period and a period for the regeneration of the sulfided absorbing composition. The absorption process comprises contacting a gaseous stream which contains hydrogen sulfide with the absorbing composition to thereby remove hydrogen sulfide from the gaseous stream. The absorbing composition becomes sulfided during the absorption period. When the absorbing composition becomes sulfided to the point that regeneration is desirable, preferably when it is nearly completely sulfided, an oxygen-containing gas is passed in contact with the absorbing composition to regenerate the absorbing composition and to convert the absorbed sulfur to a sulfur oxide.

The chemical changes that are believed to occur in the absorbing composition during this cyclic process are summarized in the following equations:

$$ZnO + H_2S \rightarrow ZnS + H_2O \qquad (I)$$

$$ZnS + Oxygen \rightarrow ZnO + SO_x \qquad (II)$$

The absorbing composition of the present invention can be utilized to remove hydrogen sulfide from any suitable gaseous stream. The hydrogen sulfide may, for example, be produced by the hydrodesulfurization of organic sulfur compounds or may be originally present in the gaseous stream as hydrogen sulfide. Examples of such suitable gaseous streams include hydrogen sulfide-contaminated light hydrocarbons such as methane, ethane and natural gas; gases derived from petroleum products and products from extraction and/or liquefication of coal and lignite; gases derived from tar sands and shale oil; coal-derived synthesis gas; gases such as hydrogen and nitrogen; gaseous oxides of carbon; steam and the inert gases such as helium and argon. Gases that adversely affect the removal of hydrogen sulfide and which should be absent from the gaseous streams being processed are oxidizing agents, examples of which include air, molecular oxygen, the halogens, and the oxides of nitrogen.

The absorbing composition of the present invention can also be utilized to remove hydrogen sulfide from hydrogensulfide-contaminated olefins such as ethylene. This process, however, should be carried out in the absence of free hydrogen to avoid hydrogenation of the olefins. Olefin streams should not be hydrodesulfurized as this may result in undesirable hydrogenation of at least a portion of the olefins to paraffins.

The sulfur removal processes of the present invention can be carried out by means of any apparatus whereby there is achieved an alternate contact of the absorbing composition with the sulfur-containing gaseous feed stream and, thereafter, of the absorbing composition with an oxygen-containing gas which is utilized to regenerate the absorbing composition. The sulfur removal process is in no way limited to the use of a particular apparatus. The sulfur removal process of this invention can be carried out using a fixed bed of absorbing composition, a fluidized bed of absorbing composition, or a moving bed of absorbing composition. Presently preferred is a fixed bed of absorbing composition.

In order to avoid any casual mixing of the gaseous feed stream containing hydrogen sulfide with the oxygen-containing gas utilized in the regeneration step, provision is preferably made for terminating the flow of the gaseous feed stream to the reactor and subsequently injecting an inert purging fluid such as nitrogen, carbon dioxide or steam. Any suitable purge time can be utilized but the purge should be continued until all hydrocarbon and/or hydrogen sulfide are removed. Any suitable flow rate of the purge fluid can be utilized. A presently preferred purge fluid flow rate is one which will give a gaseous hourly space velocity (GHSV) in the range of from about 800 GHSV to about 1200 GHSV. As used herein the term "gaseous hourly space velocity" is defined as the ratio of the reactor volume to gaseous volumetric flow rate at standard conditions of 60° F. and one atmosphere of pressure.

Any suitable temperature for the sulfur-removal processes of the present invention can be utilized which will achieve the desired removal of sulfur from a gaseous feed stream. The temperature will generally be in the range of from about 150° C. to about 600° C. and will more preferably be in the range of from about 200° C. to about 450° C.

Any suitable temperature can be utilized which will regenerate the absorbing composition from its sulfided form back to the original absorbing composition form. The regeneration temperature will generally be in the range of from about 370° C. to about 815° C. The regeneration temperature is preferably in the range of from about 425° C. to about 750° C. Most preferably, the regeneration temperature should range from about 425° C. to about 600° C.

Any suitable pressure can be utilized for the processes of the present invention. The pressure of the gaseous feed stream being treated is not believed to have an important effect on the absorption process of the present invention, and will generally be in the range of from about atmospheric to about 2,000 psig during the treatment.

Any suitable residence time for the sulfur-containing gaseous feed stream in the presence of the absorbing composition of the present invention can be utilized. The residence time expressed as volumes of gas at standard temperature and pressure per volume of absorbing composition per hour will generally be in the range of about 10 to about 10,000 and will more preferably be in the range of about 250 to about 2500.

When the absorbing composition is completely sulfided it will no longer combine with the hydrogen sulfide in the manner set forth in equation (I). When this condition occurs, hydrogen sulfide will begin to appear in the effluent flowing from the reaction and this will be an indication that the absorbing composition should preferably be regenerated. The time required for the absorbing composition to become completely sulfided will generally be a function of the concentration of sulfur in the feedstock and feed rate employed.

When the absorbing composition becomes substantially completely sulfided, the absorbing composition is typically regenerated by terminating the flow of feed to the reactor and purging with an inert fluid such as nitrogen to remove any combustibles. A free oxygen-containing gas is then introduced to the reactor for the purpose of oxidizing the zinc sulfide in accordance with equation (II). The amount of oxygen supplied to the reactor during the regeneration step will generally be that which is sufficient to at least substantially remove sulfur from the absorbing composition. The regeneration step is generally conducted at about atmospheric pressure The following examples are presented in further illustration of the invention.

EXAMPLE I

This example describes the method of preparation of the absorbent composition and provides a comparison of the crush strength of the compositions produced using the novel process with several control compositions that were prepared using alternative methods. The crush strengths presented in Table I is average particle crush strength for the given composition. The average particle crush strength was determined by placing a particle between two anvils, forcing them together, and measuring the amount of force that it took to fracture the particle. The space between the two anvils are set so that at maximum compression it would be slightly less than the diameter of the material to be tested. This allowed the particles to be broken with no compression of the powder. One eighth-inch diameter anvils were used to measure the strength of $\frac{1}{8}''$ diameter extrudates. The minimum distance between the anvils at maximum compression was set at three thirty seconds of an inch. The force was measured using an Ametek AccuForce II 0.50 lb. force gage mounted on an Ametek Model 100 motorized Test System. A total of 50 particles from each sample were tested to obtain the average crush strength. For compositions C, D, and E, the crush strengths are presented as the mean values plus or minus the Student's t value times the standard deviation divided by the square root of the number of replicates.

The data set forth in Table I show that the absorbent compositions, which were treated with a fluorine-containing acid, exhibited crush strengths that far exceed the crush strengths of similar absorbent compositions that have not undergone treatment with a fluorine-containing acid. Additionally, the acid-treated composition has a crush strength which is as good or better than an absorption composition which has not been acid treated but which has an alumina binder.

TABLE I

| Sample | Binder | Composition ZnO/Silica/Alumina | Crush Strength (lbs) |
|---|---|---|---|
| A | No Binder (Control) | 50/50/0 | 1–3 |
| B | Alumina (Control) | 50/40/10 | 8.4 |
| C | HF | 50/50/0 | 7.9 ± 0.9 |
| D | HF | 50/50/0 | 9.1 ± 1.1 |
| E | $H_2SiF_6$ | 50/50/0 | 8.3 ± 1.0 |

Composition A was prepared by combining a zinc oxide powder with a silica in amounts so as to give a composition comprising 50 parts by weight of zinc oxide per 100 parts by weight of the total combined weight of zinc oxide and silica and 50 parts by weight of silica per 100 parts by weight of the total combined weight of zinc oxide and silica. The zinc oxide used in the preparation was obtained from St. Joe Minerals Corporation of Palmerton, Pa. The silica used in the preparation was a diatomaceous earth provided by Fischer Scientific Company of Pittsburgh, Pa. The combined zinc oxide and silica was dry mixed for about three minutes prior to being mulled in a solution comprising 118.44 parts by weight water and 1.48 parts by weight concentrated nitric acid to form an extrudable paste. The extrudable paste was extruded and subsequently dried overnight in air followed by additional drying at a temperature of about 110° C. for about three hours. The dried extrudate was then calcined at a temperature of about 500° C. for about three hours. The finished composition was tested for particle crush strength the results of which are reported in Table I for Sample A.

Composition B was prepared by combining, while stirring, 15 parts by weight of concentrated acetic acid and 112 parts by weight water to form an acetic acid solution. The solution was stirred for about 10 minutes. A mixture of 50 parts by weight zinc oxide, 40 parts by weight silica, and 10 parts by weight alumina was prepared by combining the components in a sigma mixture and mixing for about 5 minutes. After the mixing of the zinc oxide, silica and alumina, the acetic acid solution was added followed by mixing for a period of about 15 minutes to form a paste. The resulting paste was then extruded to make an extrudate. The extrudate was dried at a temperature of 140° C. for about 3 hours followed by calcination at 635° C. for about 3 hours. The final composition was tested for crush strength the results of which are reported in Table I for Sample B.

Composition C was prepared by initially forming a hydrogen fluoride (HF) acid solution which contained 491.5 grams of distilled water and 43.9 grams of concentrated HF acid comprising 48 percent HF to water and mixing the HF acid solution with a blended mixture of celite silica and zinc oxide. The celite silica was Celite Filter-Cel Silica which is a diatomite that is commercially available from Manville, Filtration & Minerals of Denver, Colo. The zinc oxide used in the absorption composition was obtained from St. Joe Resources Company of Monaca, Pa. The blended mixture of celite silica and zinc oxide was prepared by first mixing in a muller mixer 567.5 grams of celite silica for a period of 5 minutes, after which time, 567.5 grams of zinc oxide was added to the celite silica within the muller pan over a 5 minute period. Once the celite silica and zinc oxide had been combined, the mixture was blended by the muller mixer for an additional 10 minutes to assure homogeneity. The earlier prepared HF acid solution was added to the mixture over a 5 minute interval while simultaneous mixing the combined materials. After the addition of the HF acid solution was completed, mixing by the muller mixer continued for another 15 minutes. Following the completion of the mixing of the HF acid solution with the celite silica and zinc oxide mixture, the resultant paste was allowed to cure or age, without mixing, for 30 minutes. The paste was formed into an agglomerate extrudate by use of a Baker-Perkins Inc. twin-screw extruder having 2.25 inch diameter screws and a die having one-eighth (⅛) inch diameter holes. The screw shafts were rotated at a speed of 600 rpm (rotations per minute). The extrudate was dried in a draft oven at 160° C. for about 24 hours followed by calcination at 635° C. for about 0.85 hours. The finished composition was tested for particle crush strength the results of which are reported for Sample C in Table I.

Composition D was prepared by initially forming a hydrogen fluoride (HF) acid solution which contained 442.4 grams of distilled water and 43.9 grams of concentrated HF acid comprising 48 percent HF to water and mixing the HF acid solution with a blended mixture of celite silica and zinc oxide. The celite silica was Celite Filter-Cel Silica which is a diatomite that is commercially available from Manville, Filtration & Minerals of Denver, Colo. The zinc oxide used in the absorption composition was obtained from St. Joe Resources Company of Monaca, Pa. The blended mixture of celite silica and zinc oxide was prepared by first mixing in a muller mixer 567.5 grams of celite silica for a period of 5 minutes, after which time, 567.5 grams of zinc oxide was added to the celite silica within the muller pan over a 5 minute period. Once the celite silica and zinc oxide had been combined, the mixture was blended by the muller mixer for an additional 10 minutes to assure homogeneity. The earlier prepared HF acid solution was added to the mixture over a 5 minute interval while simultaneous mixing the combined materials. After the addition of the HF acid solution was completed, mixing by the muller mixer continued for another 30 minutes. Following the completion of the mixing of the HF acid solution with the celite silica and zinc oxide mixture, the resultant paste was allowed to cure or age, without mixing, for 30 minutes. The paste was formed into an agglomerate extrudate by use of a Baker-Perkins Inc. twin-screw extruder having 2.25 inch diameter screws and a die having one-eight (⅛) inch diameter holes. The screw shafts were rotated at a speed of 600 rpm. The extrudate was dried in a draft oven at 160° C. for about 24 hours followed by calcination at 635° C. for about 0.85 hours. The finished composition was tested for particle crush strength the results of which are reported for Sample D in Table I.

Composition E was prepared by blending a mixture of 107.4 grams celite silica and 113.5 grams zinc oxide with a sigma mixer for a period of 10 minutes to assure homogeneity. The celite silica was Celite Filter-Cel Silica which is a diatomite that is commercially available from Manville, Filtration & Minerals of Denver, Colo. The zinc oxide used in the absorption composition was obtained from St. Joe Resources Company of Monaca, Pa. An earlier prepared 30 percent flourosilicic acid solution was added to the mixture while simultaneously mixing the combined materials. After the addition of the flourosilicic acid solution was completed, mixing by the sigma mixer continued for another 15 minutes. Following the completion of the mixing of the fluorosilicic acid solution with the celite silica and zinc oxide mixture, 4.54 grams of stearic acid was added after which time the mixture continued to be mixed by the sigma mixer for 5 minutes. Because the material was to dry too extrude, an additional 21.2 grams of the flourosilicic acid solution was added to 240.7 grams of the mixture. The resultant paste was then formed into an agglomerate extrudate by use of a Baker-Perkins Inc. twin-screw extruder having 2.25 inch diameter screws and a die having one-eight (⅛) inch diameter holes. The screw shafts were rotated at a speed of 650 rpm (rotations per minute). The extrudate was dried in a draft oven at 160° C. for about 24 hours followed by calcination at 635° C. for about 0.85 hours. The finished composition was tested for particle crush strength the results of which are reported in Table I.

The invention described herein provides an improved method for manufacturing an improved composition capable of removing sulfur compounds from fluid streams. By utilizing the improved processes for manufacturing the improved absorption composition, the crush strength or mechanical strength is significantly increased thereby improving its usefulness in commercial processes and its regenerability.

While this invention has been described in detail for purposes of illustration, it is not to be construed as limited thereby but is intended to include all reasonable variations and modifications within the scope and spirit of the described invention and the appended claims.

That which is claimed is:

1. An absorption composition comprising a mixture of zinc oxide, silica and a fluorine-containing acid.

2. A composition as recited in claim 1 wherein said silica is selected from the group consisting of diatomite, silicalite, silica colloid, flame-hydrolyzed silica, precipitated silica and combination of any two or more thereof.

3. A composition as recited in claim 1 wherein said fluorine-containing acid is selected from the group consisting of dihydrogen hexafluorotitanate, tetrafluoroboric acid, phosphorofluoridic acid, hydrogen hexafluorophosphate, dihydrogen hexafluorosilicate, hydrofluoric acid, and combinations of any two or more thereof.

4. A composition as recited in claim 3 wherein said fluorine-containing acid has a concentration in the range of from about 0.1 to about 25 parts by weight per 100 parts by weight of zinc oxide and silica and said composition is in the form of an extrudable paste.

5. A composition as recited in claim 4 wherein said extrudable paste is in the form of an extrudate.

6. A composition as recited in claim 5 wherein said extrudate is in the form of a calcined extrudate.

7. A process for the preparation of an absorption composition comprising the steps of:
 (a) mixing a fluorine-containing acid with zinc oxide and silica to form a mixture; and
 (b) agglomerating said mixture.

8. A process as recited in claim 7 further including: blending of said zinc oxide and said silica prior to mixing said fluorine-containing acid in step (a).

9. A process as recited in claim 8 further including: curing of said mixture subsequent to said mixing step (a) and prior to said agglomerating step (b).

10. A process as recited in claim 9 further including: drying said mixture subsequent to said agglomerating step (b); and
thereafter calcining said mixture.

11. A process as recited in claim 7 wherein said agglomerating step (b) is selected from the group of process steps consisting of molding, tableting, pressing, pelletizing, extruding, and tumbling.

12. A process as recited in claim 11 wherein said agglomerating step is extruding.

13. A process for the preparation of an absorption composition comprising the steps of:
 (a) mixing, in an inclined rotating disk having a rim, zinc oxide and silica to form a mixture; and
 (b) agglomerating said mixture into spherically shaped balls by spraying a fluorine containing acid upon said mixture while mixing by said inclined rotating disk.

14. A process as recited in claim 13 wherein said mixture of mixing step (a) further includes alumina and nickel oxide.

15. A strength-enhanced composition prepared by the steps of:
 (a) mixing a fluorine-containing acid with zinc oxide and silica to form a mixture; and
 (b) agglomerating said mixture.

16. A strength-enhanced composition prepared by the steps of:
 (a) mixing, in an inclined rotating disk having a rim, zinc oxide and silica to form a mixture; and
 (b) agglomerating said mixture into spherically-shaped balls by spraying a fluorine-containing acid upon said mixture while mixing by said inclined rotating disk.

17. A strength-enhanced composition as recited in claim 15 prepared further by the step of:
blending of said zinc oxide and said silica prior to mixing said fluorine-containing acid in step (a).

18. A strength-enhanced composition as recited in claim 17 prepared further by the step of:
curing of said mixture subsequent to said mixing step (a) and prior to said agglomerating step (b).

19. A strength-enhanced composition as recited in claim 18 prepared further by the step of:
drying said mixture subsequent to said agglomerating step (b); and
thereafter calacining said mixture.

20. A strength-enhanced composition as recited in claim 19 wherein said agglomerating step (b) is selected from the group of process steps consisting of molding, tableting, pressing, pelletizing, extruding, and tumbling.

21. A strength-enhanced composition as recited in claim 20 wherein said agglomerating step is extruding.

22. A strength-enhanced composition as recited in claim 16 wherein said mixture of mixing step (a) further includes alumina and nickel oxide.

23. An absorption composition prepared by mixing zinc oxide, silica and a fluorine-containing acid.

24. An absorption composition as recited in claim 23 wherein said silica is selected from the group consisting of diatomite, silicalite, silica colloid, flame-hydrolyzed silica, precipitated silica and combination of any two or more thereof.

25. An absorption composition as recited in claim 23 wherein said fluorine-containing acid is selected from the group consisting of dihydrogen hexafluorotitanate, tetrafluoroboric acid, phosphorofluoridic acid, hydrogen hexafluorophosphate, dihydrogen hexafluorosilicate, hydrofluoric acid, and combinations of any two or more thereof.

26. An absorption composition as recited in claim 25 which is in the form of an extrudable paste and wherein said fluorine-containing acid utilized in the mixing step is present in the composition at a concentration in the range of from about 0.1 to about 25 parts by weight per 100 parts by weight of zinc oxide and silica.

27. An absorption composition as recited in claim 26 wherein said extrudable paste is extruded to form an extrudate.

28. An absorption composition as recited in claim 27 wherein said extrudate is calcined to form a calcined extrudate.

* * * * *